UNITED STATES PATENT OFFICE.

AMY HINTON, OF WATTS, CALIFORNIA.

PROCESS OF MAKING SORGHUM SIRUP.

1,403,412.  Specification of Letters Patent.  Patented Jan. 10, 1922.

No Drawing.  Application filed July 19, 1919. Serial No. 312,094.

*To all whom it may concern:*

Be it known that I, AMY HINTON, a citizen of the United States, residing at Watts, in the county of Los Angeles and State of California, have invented new and useful Improvements in Processes for Making Sorghum Sirup, of which the following is a specification.

My invention relates to a process of producing sorghum sirup whereby an absolutely pure and clear sirup will be produced.

With my process I use the juice from freshly crushed sorghum stalks and strain the same through three-ply cheese cloth or house lining, I having found other cloth entirely unsuitable. Before the juice is settled I place a determined quantity, say fifty gallons in a plain vat or pan and boil for thirty minutes, skimming constantly. The boiling causes certain of the particles thereof to coagulate and the lighter particles to rise to the surface with the scum, the same being removed in the skimming process. Thereafter I add an equal quantity, that is, fifty gallons more of the cold juice. The mixing of the cold with the heated saccharine juice accelerates granulation. I then add a heaping tablespoonful of baking soda (saleratus). I have found that one heaping teaspoonful of soda will cause coagulation in the quantity of juice used, to wit: 100 pounds, minus the quantity lost in the boiling process, and also that the action of the soda arrests fermentation and acidification and causes impurities in the liquid to be precipitated to the top thereof, such impurities being removed by skimming. I then allow the mass to evaporate, still skimming constantly until it will spin a little thread when dropped from the skimmer. In the period of evaporation, the sirup is defecated and by my process I produce a clear pure sirup that will keep years without fermenting in an open vessel.

Having described the invention, what I claim is:—

The herein described process of manufacturing sorghum sirup, consisting of boiling fifty gallons of strained sorghum juice for a period of thirty minutes, constantly skimming the froth therefrom, adding fifty gallons of cold sorghum juice to the heated juice, stirring and skimming the same, adding thereto one tablespoon of baking soda, removing the scum and impurities precipitated by the action of the soda on the sirup, and permitting the mass to evaporate and clarify in the process of evaporation while still skimming the surface of the sirup, said evaporation being continued until a thread-like substance drops from the skimmer.

In testimony whereof I affix my signature.

AMY HINTON.